United States Patent
Behzad

(10) Patent No.: US 8,014,467 B2
(45) Date of Patent: Sep. 6, 2011

(54) TRANSMITTER PRE-DISTORTION ACROSS WIDE TRANSMIT POWER DYNAMIC RANGE

(75) Inventor: Arya Reza Behzad, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 854 days.

(21) Appl. No.: 12/031,681

(22) Filed: Feb. 14, 2008

(65) Prior Publication Data

US 2009/0207935 A1    Aug. 20, 2009

(51) Int. Cl.
    *H04L 25/03*    (2006.01)
(52) U.S. Cl. ........................................... 375/296
(58) Field of Classification Search .................. 375/296; 398/193; 455/114.3
    See application file for complete search history.

(56) References Cited

U.S. PATENT DOCUMENTS

| 6,591,090 B1* | 7/2003 | Vuorio et al. ............ 455/126 |
| 7,340,005 B2* | 3/2008 | Kim et al. ............... 375/296 |
| 2004/0062326 A1* | 4/2004 | Burke et al. ............ 375/345 |
| 2006/0127104 A1* | 6/2006 | Harley et al. ........... 398/198 |
| 2009/0111399 A1* | 4/2009 | Norris et al. ........... 455/114.3 |

* cited by examiner

*Primary Examiner* — Sam K Ahn
(74) *Attorney, Agent, or Firm* — Garlick Harrison & Markison; Bruce E. Garlick

(57) ABSTRACT

An integrated circuit radio transceiver and method therefor includes an integrated circuit radio transceiver operable to provide pre-distortion settings that correspond to specified analog transmit path gain levels. Further, a change in gain is provided solely through digital gain when the new gain is within a specified range. If the gain change is not within the specified range, the gain is provided by a new transmit path gain module and, if necessary, with additional digital gain. Additionally, a new pre-distortion setting is applied to correspond to the new analog transmit path gain setting.

24 Claims, 9 Drawing Sheets

FIG. 4 wireless transceiver transmit path 250

| Total Gain | Analog Gain | Digital Gain | Pre-dist. setting |
|---|---|---|---|
| $W_1$ | $X_1$ | $Z_{min}$ | $Y_1$ |
| $W_2$ | $X_1$ | $Z_{max}$ | $Y_1$ |
| $W_3$ | $X_2$ | $Z_{min}$ | $Y_2$ |
| $W_4$ | $X_2$ | $Z_{max}$ | $Y_2$ |
| $W_5$ | $X_N$ | $Z_{min}$ | $Y_N$ |
| $W_M$ | $X_N$ | $Z_{max}$ | $Y_N$ |

*FIG. 7* exemplary predistortion setting table 360

| Gain | Pre-Dist setting |
|---|---|
| $X_1$ | $Y_1$ |
| $X_2$ | $Y_2$ |
| $X_3$ | $Y_3$ |
| ••• | ••• |
| $X_N$ | $Y_N$ |

*FIG. 6* exemplary predistortion setting table 350

| Total Gain | Analog Gain | Digital Gain | Pre-distortion setting |
|---|---|---|---|
| -9 dB → -3 dB | -6 dB | -3 dB → +3 dB | $Y_1$ |
| -3 dB → +3 dB | 0 dB | -3 dB → +3 dB | $Y_2$ |
| 3 dB → 9 dB | 6 dB | -3 dB → +3 dB | $Y_3$ |
| +9 dB → 15 dB | 12 dB | -3 dB → +3 dB | $Y_4$ |

*FIG. 8* exemplary predistortion setting table 370

TRANSMITTER PRE-DISTORTION ACROSS WIDE TRANSMIT POWER DYNAMIC RANGE

BACKGROUND

1. Technical Field

The present invention relates to wireless communications and, more particularly, to circuitry for wireless communications.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

Typically, a digital processor produces outgoing digital signals that are converted to an analog form, amplified, filtered, and power amplified prior to transmission. One problem, though, is that the modules in an analog transmit path often create phase and or amplitude distortion that, in turn, introduces other anomalies such as spectral regrowth. It is known to provide pre-distortion compensation for a signal that is being conducted through the analog transmit path and then power amplified and transmitted. Such pre-distortion compensation, does not always provide compensation that is optimal thus resulting in the anomalies including spectral regrowth.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIG. 6 is an exemplary table that illustrates a mapping between specified gain levels and pre-distortion levels according to one embodiment of the invention;

FIGS. 7 and 8 are exemplary tables that illustrates a mapping between specified various gain levels and pre-distortion levels according to various embodiments of the invention;

DETAILED DESCRIPTION OF THE DRAWINGS

Figure 1:
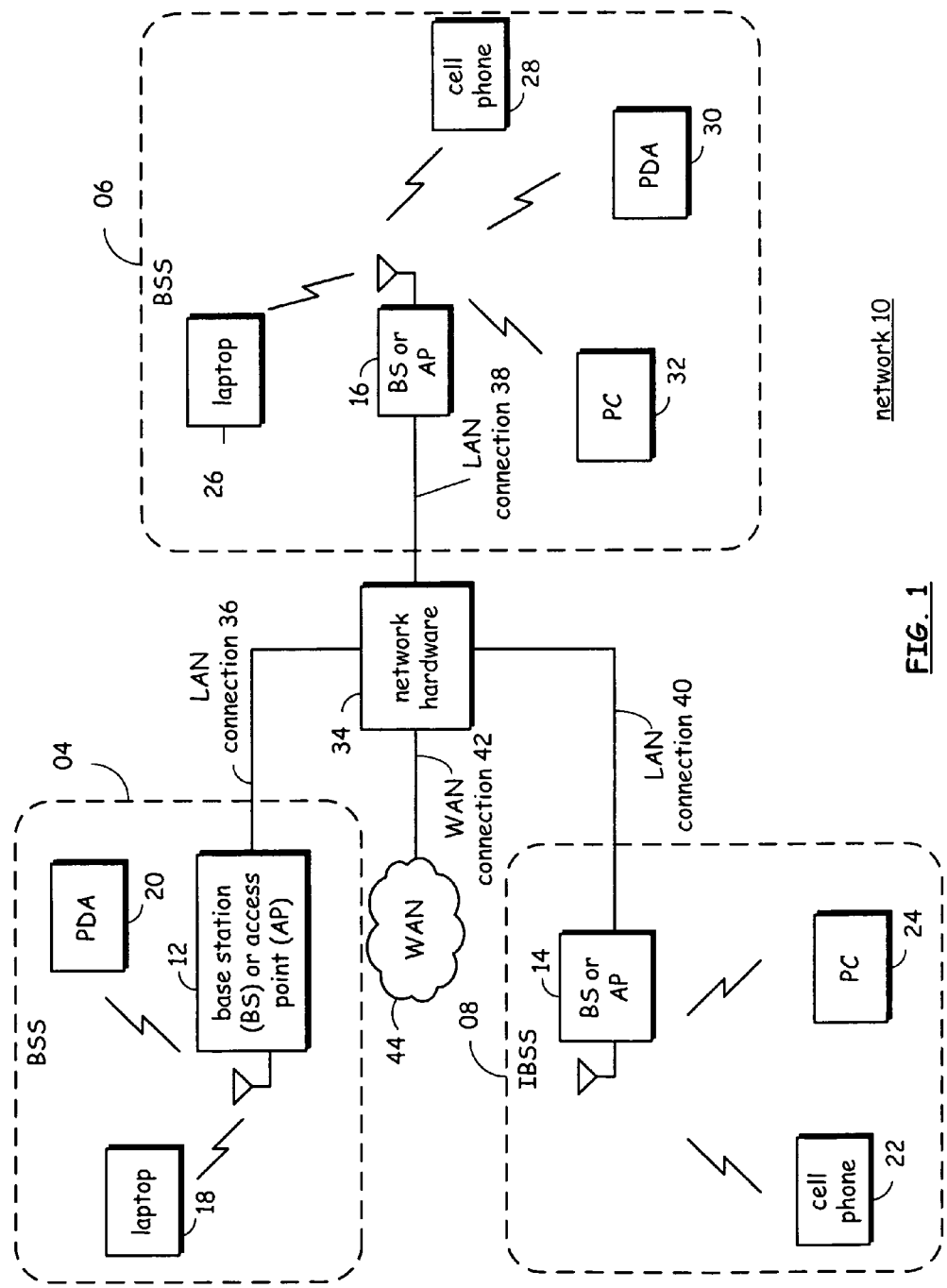
FIG. 1 is a schematic block diagram illustrating a wireless communication device that includes a host device and an associated radio.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2-10.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
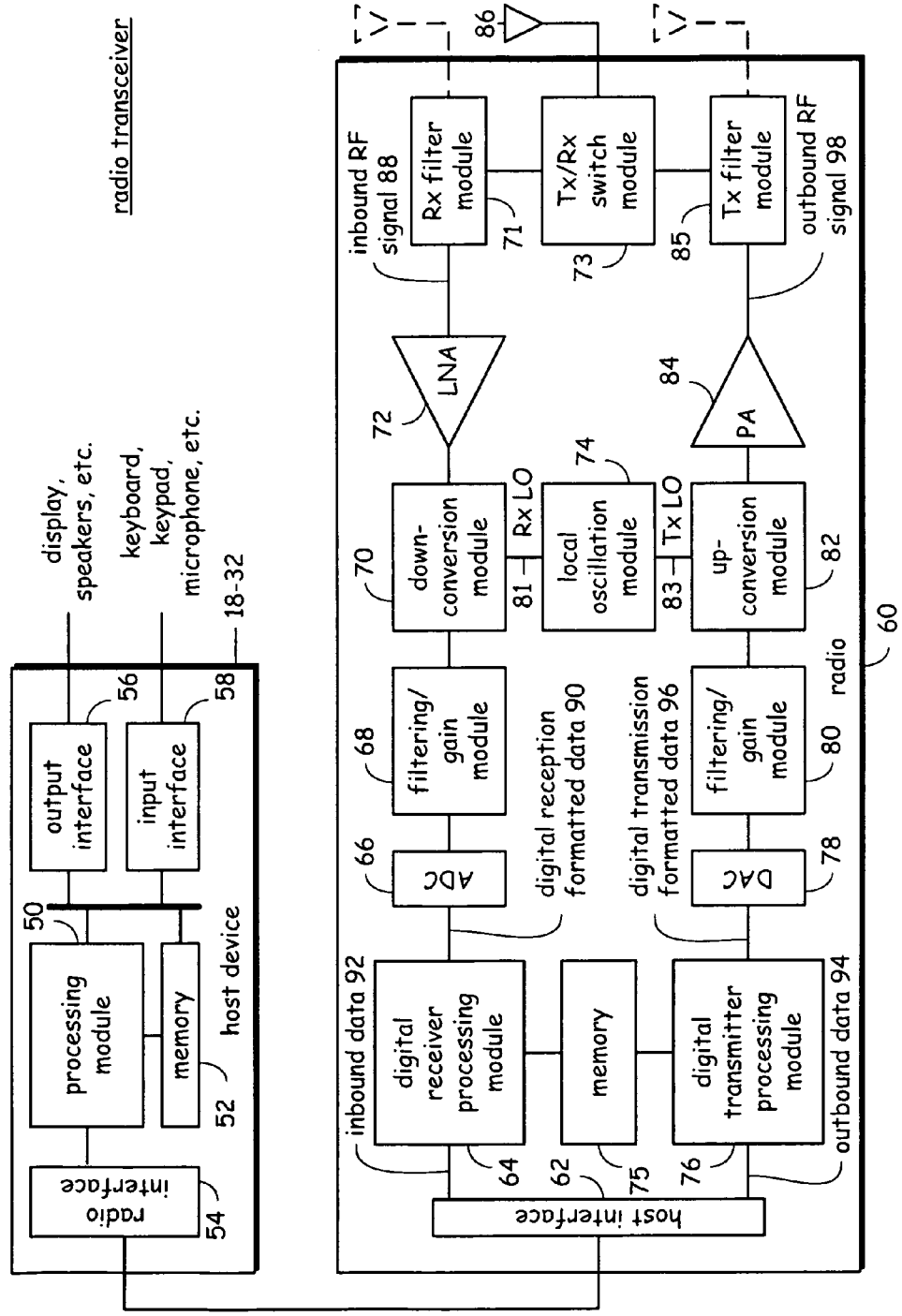
FIG. 2 is a schematic block diagram illustrating a wireless communication host device and an associated radio.

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (e.g., IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
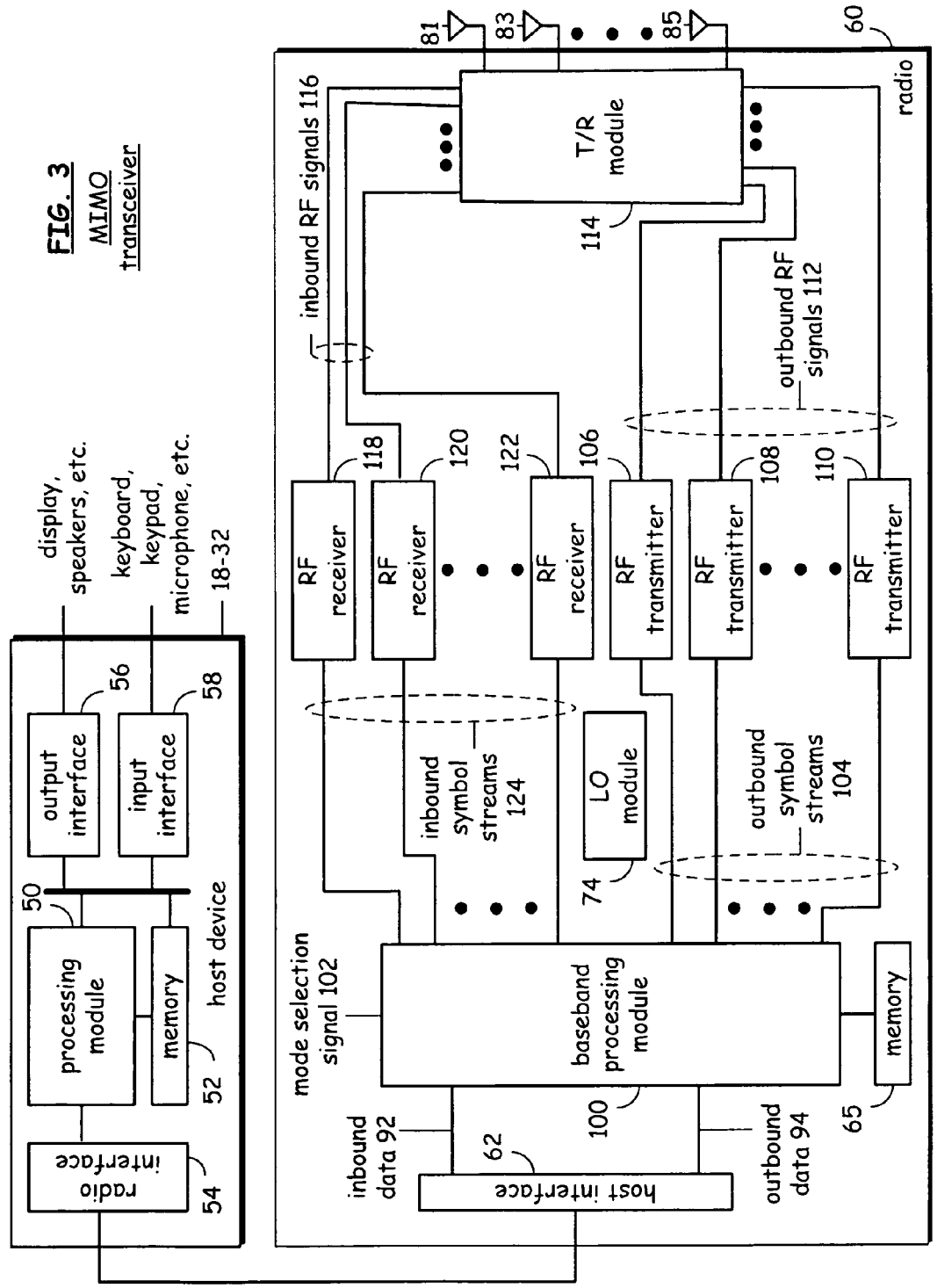
FIG. 3 is a schematic block diagram illustrating a wireless communication device that includes the host device and an associated radio in an alternate embodiment.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Finally, is should be mentioned that digital processing module 76 of FIG. 2 and baseband processing module 100 of FIG. 3 are, in embodiment, of the invention, operable to provide pre-distortion compensation based upon an analog transmit path gain to provide optimal compensation as gain levels of the analog transmit path are changed based upon operational demands and/or conditions. The radio transceivers of FIGS. 2 and 3 and the circuitry and methods described below may further be implemented within the wireless transceivers of the network of FIG. 1.

Figure 4:
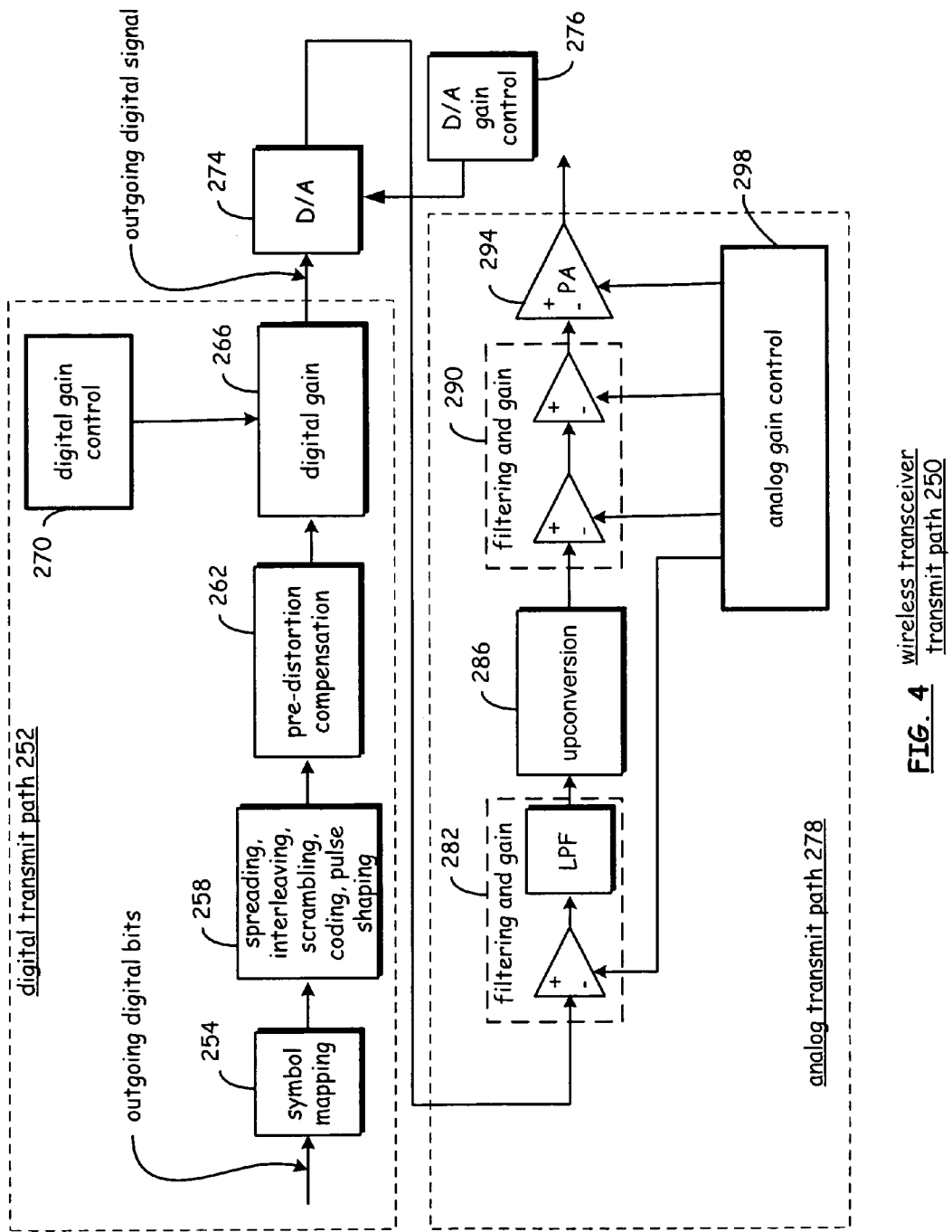
FIG. 4 is a functional block diagram of a wireless transceiver transmit path according to one embodiment of the invention.

FIG. 4 is a functional block diagram of a wireless transceiver transmit path 250 according to one embodiment of the invention. Though not specifically shown here, a baseband or other digital processor typically produces outgoing digital data that is received and processed by a plurality of known digital processing blocks or modules (collectively, a digital transmit path 252) that includes modules such as symbol mapping module 254, one or more modules 258 that collectively perform spreading, interleaving, scrambling, coding and pulse shaping and a pre-distortion compensation module 262. It should be understood that modules of the digital transmit path of the comprise digital functionality that perform one or more specified functions to create a digital signal that eventually is converted to a traditional analog signal form for processing and transmission from a transmit path. Moreover, the modules and functionality listed for the digital transmit path 252 are exemplary and may be changed according to specific design requirements. Specifically, for example, some of the functionality may be removed or other functionality, such as up-sampling modules and decimation modules to modify a sample rate of the digital data may be included.

Pre-distortion compensation module 262 is operable to introduce phase and/or magnitude compensation to a received digital signal to compensate for downstream analog transmit path distortion. In the embodiment of FIG. 4, pre-distortion compensation module 262 is operable to provide a plurality of compensation settings (or pre-distortion curves) based upon a corresponding plurality of gain settings within the analog transmit path. Generally, a pre-distortion curve is determined for each analog transmit path gain setting. The pre-distortion curves thus define the pre-distortion gain settings that are applied to a digital signal to pre-compensate for downstream distortion that will be introduced in the analog transmit path.

Additionally, a digital gain module 266 typically provides a specified amount of digital gain to the outgoing digital signals. Here, digital gain module 266 produces a digital gain based upon a received digital gain control signal produced by digital gain control 270 that includes logic for adjusting the digital gain as will be described in greater detail below. The outgoing digital signal produced by digital gain module 266 is then produced to a digital-to-analog conversion module 274. As may be seen, digital-to-analog conversion module 274 is also coupled to receive a gain control signal from a digital-to-analog gain control module 276. Digital-to-analog gain control module 276 is operable to adjust a gain of digital-to-analog conversion module 274 which is therefore operable to produce an outgoing analog baseband or intermediate frequency band signal for processing to and by an analog transmit path 278 having an adjustable gain level. While these gain settings technically are in the analog transmit path, they are treated separately from all other gain settings in the analog transmit path because digital-to-analog conversion module 274 effectively adjusts the gain of the input digital signal and therefore does not affect the analog transmit path distortion levels or linearity. Accordingly, references herein to adjust a digital gain specifically include adjusting the gain of digital-to-analog conversion module 274.

Analog transmit path 278 includes filtering and gain module 282, upconversion module 286, filtering and gain module 290 and power amplifier 294. In the described embodiment, filtering and gain module 282, filtering and gain module 290 and power amplifier 294 are each operably disposed to receive gain control signals from analog gain control module 298. Moreover, the modules may comprise a plurality of modules. For example, in one embodiment, filtering and gain module 290 may comprise a plurality of high-pass variable gain amplifiers that provide amplification and high-pass filtering for an outgoing radio frequency signal that has already be upconverted from a baseband frequency signal or from an intermediate frequency signal. Analog gain control 298 is therefore operable to provide at least one of gain control and filter control to a plurality of filtering and gain control modules in the analog transmit path 278.

In operation, digital gain control module 270, digital-to-analog gain control module 276 and analog gain control module 298 collectively define a total gain of a signal being wirelessly transmitted from an antenna operably disposed to receive the output of power amplifier 294. Pre-distortion compensation module 262, however, produces a pre-distortion compensation to an outgoing digital signal based upon a specified analog transmit path gain setting specified by analog gain and filter control module 298. The references herein to "specified gain levels" for the analog transmit path refer to analog transmit path gain settings for which a specific pre-distortion compensation setting is generated by pre-distortion compensation module 262.

In a preferred embodiment, the specified gain levels of the analog transmit path 278 are discrete gain settings with a constant step size. In an alternate and equivalent embodiment, however, pre-distortion settings are defined for analog transmit path gain settings that fall within a specified range. One aspect of the embodiments of the present invention is that digital gain control 270 and digital-to-analog gain control module 276 are operable to provide digital gain adjustments to supplement a current analog transmit path gain to provide a desired total gain. Thus, if a new total desired gain is one that can be achieved by changing only the digital gain, then only the digital gain is changed and a current pre-distortion compensation setting is not modified to maintain effectiveness.

Typically, however, a limit is specified for total digital gain changes because of performance limitations of the digital to analog conversion module 274. Thus, if the gain adjustment exceeds a maximum value allowed, the gain of the analog transmit path 278 is changed to be proximate to the desired total gain (within a tolerance or range) and then the digital gain is adjusted to provide the desired total gain.

One aspect of the embodiments of the invention is that the pre-distortion compensation module 262 is operable to produce a plurality of pre-distortion curves that define pre-distortion settings that correspond to a corresponding plurality of specified gain levels of the analog transmit path 278. Alternatively, the pre-distortion settings correspond to gain settings of a subset of the analog gain modules in the transmit path. In one specific embodiment, the pre-distortion compensation curves (and associated settings) correspond to gain settings of one specific module in analog transmit path 278. For example, a plurality of pre-distortion curves may be defined for a corresponding plurality of gain level settings of power amplifier 274. This embodiment is advantageous in that power from the power amplifier is not wasted for lower gain settings. In contrast, many prior art systems keep the power amplifier at a high or maximum power level while modifying other gain modules in the transmit path since changing the power amplifier gain level is most likely to render the single pre-distortion setting less effective.

One additional aspect of the embodiment of FIG. 4 is that the system is operable to make digital gain adjustments by changing the digital gain within digital transmit path 252 and the gain of digital-to-analog conversion module 274. If a gain change is required by either the power amplifier 294 or any other module in the analog transmit path 278, however, the gain is changed by a specified gain amount or step that has an associated pre-distortion curve. As such, new pre-distortion settings (based on pre-distortion curve) correspond to the change in the analog transmit path. Thereafter, the digital gain is adjusted to supplement the analog transmit path gain, if necessary, to produce the total amount of desired gain.

Figure 5:
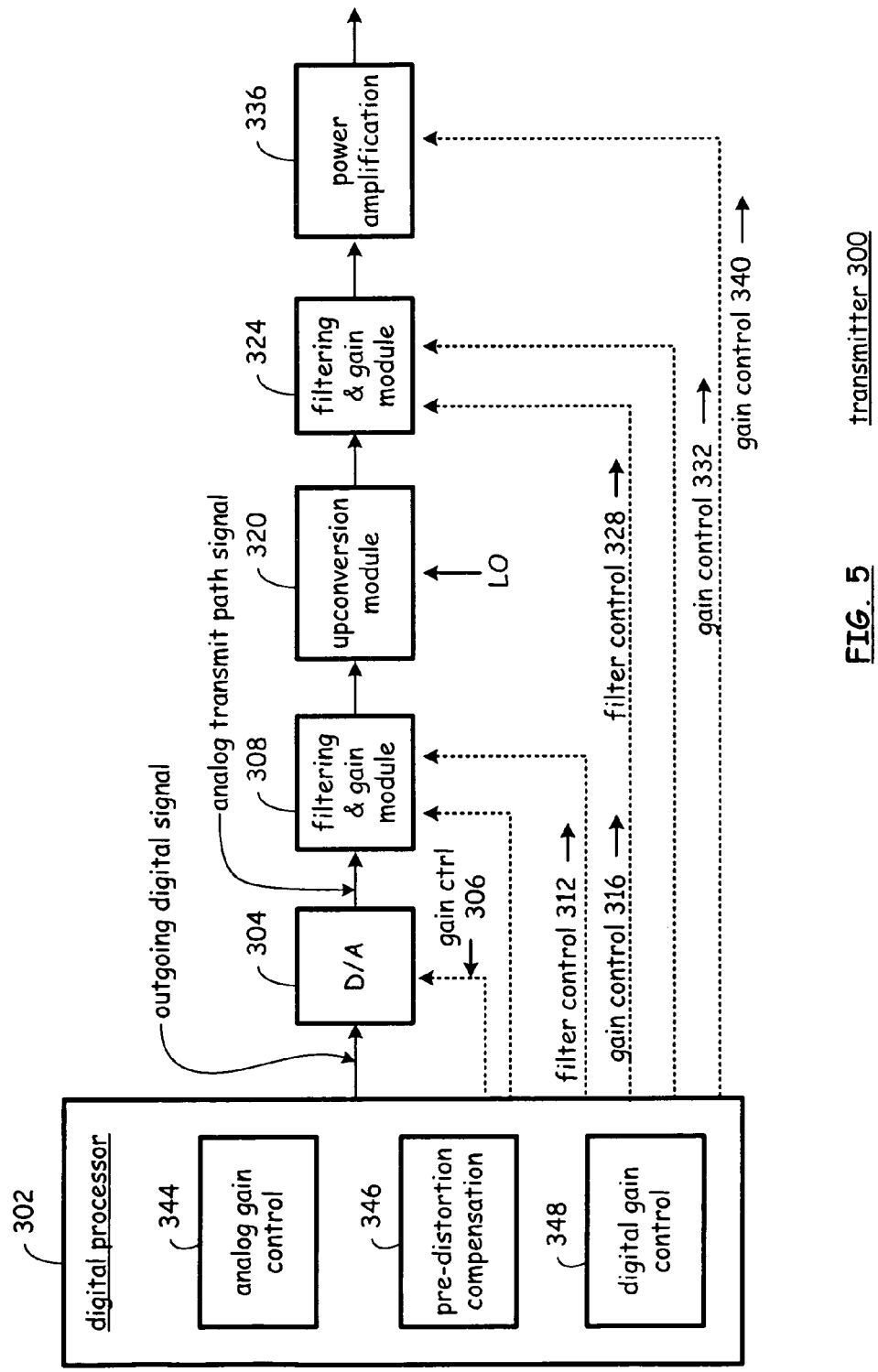
FIG. 5 is a functional block diagram of a wireless transmitter operable to provide gain based compensation according to one embodiment of the invention.

FIG. 5 is a functional block diagram of a wireless transmitter operable to provide gain based compensation according to one embodiment of the invention. As may be seen, a digital processor 302 is operably disposed to produce an outgoing digital signal to a digital to analog converter 304 which then produces an analog transmit path signal based on the outgoing digital signal to a filtering and gain module 308. Filtering and gain module 308 then produces an amplified and filtered analog transmit path signal at one of a baseband or intermediate frequency.

The output of filtering and gain module 308 is based upon the received analog transmit path signal as well as a filter control signal 312 and a gain control signal 316 received from logic or, as shown here, from digital processor 302. The output of filtering and gain module 308 is then produced to an upconversion module 320 that is operable to produce an upconverted radio frequency signal. The upconverted radio frequency signal is then produced to filtering and gain module 324. Filtering and gain module 324 then produces and an outgoing amplified and filtered radio frequency signal based on the upconverted radio frequency signal and also based upon a filter control signal 328 and a gain control signal 332 to power amplification module 336. Power amplification module then amplifies the outgoing amplified and filtered radio frequency signal based upon a gain control signal 340.

As may be further seen, digital processor 302 further includes analog gain control module 344 operable to specify analog transmit path gain module gain settings, pre-distortion compensation module 346 operable to set pre-distortion compensation settings based upon (corresponding to) the analog transmit path gain module gain settings and digital gain control signal 348, and digital gain control module 348 operable to specify digital gain settings. The gain levels of digital-to-analog conversion block 304 may also be set by digital processor 302. As may also be seen, digital processor 302 produces gain control signals 306 to digital-to-analog conversion module 304. These gain level settings are treated as being digital gain level changes since, in one embodiment, the gain of the input signal to conversion module 304 is effectively adjusted prior to conversion to an analog form. As such, these adjustments do not affect distortion that is introduced in the transmit path. These gain control settings 306 may be determined either by analog gain control module 344 or by digital gain control 348. In the described embodiment, they are determined by digital gain control 348 since, effectively, they are similar to digital gain adjustments in that they do not affect the analog transmit path distortion.

In operation, digital processor 302, and more particularly, analog gain control module 344 generates gain control signals 316, 332 and 340 to control analog transmit path gain. It should be understood that more or less numbers of gain modules and control lines may be included in a transmit path. Digital processor 302 also generates filter control signals 312 and 328 to define response time and pole location of the various filters in the analog transmit path. Additionally, digital gain control module 348 adjusts a digital gain of the outgoing digital signal according to a desired total transmit path gain. Finally, pre-distortion compensation 346 produces pre-distortion settings to superimpose on or apply to the outgoing digital signal. Specific operation of the logic for the pre-distortion compensation and the analog and digital control is similar to that described above in relation to FIG. 4 as well as will be described in the discussion of the figures that follow. In general, however, pre-distortion compensation provides a plurality of pre-distortion curves that define pre-distortion settings, for a corresponding plurality of analog transmit path gain settings.

In one embodiment, the pre-distortion curves correspond only to gain settings for power amplifier 336. In another embodiment, the pre-distortion curves correspond to total analog transmit path gain settings. References herein to analog transmit path gain settings therefore include both approaches. In operation, digital processor 302 selects a new total transmit path gain setting and subsequently adjusts the digital gain only if the new total transmit path gain is within a specified threshold or amount from a current analog transmit path gain setting (either the power amplifier or total transmit path according to embodiment). If not, digital processor 302 is operable to adjust the analog transmit path gain, apply a corresponding pre-distortion compensation, and adjust the digital gain if necessary.

FIG. 6 is an exemplary table that illustrates a mapping between specified gain levels and pre-distortion levels according to one embodiment of the invention. As may be seen, each specified gain has a corresponding pre-distortion setting. The gain defined in table 350 of FIG. 6 represents an analog transmit path gain that is provided by either just one gain module or by a plurality of gain modules in an analog transmit path wherein the gain value of table 350 represents a total gain value for the plurality of gain modules.

In general, there are many implementation options for setting and adjusting analog transmit path gain. For example, even though several gain modules may be operable to produce gain according to a received control signal, a typical system implementation may comprise typically changing just one (or just a few) gain modules to adjust the analog transmit path gain. Typically, a power amplifier often produces the most distortion. Accordingly, in the prior art, a power amplifier is left at full power and only one pre-distortion setting is used. Analog transmit path gain levels are then modified by adjusting other gain modules in the analog transmit path. Here, however, a plurality of pre-distortion settings are defined to correspond to a plurality of gain settings (e.g., of the power amplifier) to improve efficiency and reduce power consumption. Table 350 of FIG. 6, therefore, reflects all such alternate approaches.

FIG. 7 is an exemplary table that illustrates a mapping between specified various gain levels and pre-distortion levels according to one embodiment of the invention. As may be seen, each specified total gain has a corresponding pre-distortion setting as well as corresponding analog and digital gain values. Generally, the total gain $W_1$ is equal to the sum of $X_1$ and a digital gain within a specified range ($Z_{min}$-$Z_{max}$). In one embodiment, $Z_{min}$ is equal to 0 dB and $Z_{max}$ is equal to a difference between $X_1$ and $X_2$. More generally, however, a difference in $Z_{max}$ and $Z_{min}$ is equal to a step size between the values of $X_1$-$X_N$. The pre-distortion settings, however, map specifically to the analog transmit path gain settings and change when the analog transmit path gain settings change. One aspect of the embodiment of the invention being illustrated in FIG. 7 is that different total gain levels may be provided with a common analog transmit path gain setting but different digital gains. Thus, for example, $W_1$ and $W_2$ both have an analog gain setting of $X_1$. Thus, different digital gain settings, both in the range of $Z_{min}$ to $Z_{max}$, are generated to supplement analog gain setting $X_1$ to provide the desired total gain. As may also be seen, because the analog transmit path gain is the same for $W_1$ and $W_2$, the pre-distortion setting for both gains is equal to $y_1$. In an alternate embodiment, gain ranges are specified in place of specific gain settings in the analog gain column. Here, a single pre-distortion compensation is provided for any analog gain within a corresponding gain range.

The total gain defined in table 360 of FIG. 7 thus represents a sum of the analog transmit path gain and the digital gain. The analog transmit path gain, as before, is provided by either just one gain module or by a plurality of gain modules in an analog transmit path. For example, if a desired total gain is equal to 7 dB and if the specified analog path gain levels are −6 dB ($X_1$), 0 dB ($X_2$), 6 dB ($X_N$) and $Z_{min}$-$Z_{max}$ ranges from −3 dB to +3 dB, the total gain may be provided by selecting an analog transmit path gain of 6 dB and a digital gain of 1 dB. If a desired total gain is equal to 5 dB, however, the gain may be provided with an analog transmit path gain of 6 dB and a digital gain of −1 dB or, alternatively, an analog transmit path gain of 3 dB and a digital gain of 2 dB.

As an example of operation of one embodiment of the present invention, if the 7 dB gain is a first total gain setting and then the transmitter determines to change the total gain to 5 dB, the transmitter is operable to merely change the digital gain since the new total gain may be provided without changing the analog transmit path gain and, therefore, without requiring a pre-distortion setting change. Thus, when a new total gain can be achieved by keeping the same analog transmit path gain (e.g., $X_1$) and changing the digital gain within the range of $Z_{min}$-$Z_{max}$, then only the digital gain is changed to provide the new total gain. The above cited gain values are exemplary specified values and may readily be modified.

An alternate approach, if the maximum range of digital gain change is 6 dB and, for example, comprises having a $Z_{min}$ of 0 dB and a $Z_{max}$ of 6 dB, the analog transmit path gain levels would then be equal to −9 dB, −3 dB, and +3 dB, to keep the same range of total gain as in the prior example. One aspect to note, regardless of the specific analog transmit path gain levels and digital gain ranges, however, is that the pre-distortion settings correspond to the analog transmit path gain level settings and change with changes in the analog transmit path gain settings (whether through a single gain module or a plurality of gain modules).

FIG. 8 is an exemplary table that illustrates a mapping between specified various gain levels and pre-distortion levels according to another embodiment of the invention. As may be seen, each range total gain in table 370 has a corresponding pre-distortion setting as well as corresponding analog gain value and a corresponding range of digital gain values. Generally, the total gain is equal to the sum of the analog gain and the digital gain. In one embodiment, for this example, the digital gain ranges from −3 dB to +3 dB. This range of 6 dB is equal to a step size between the values of the analog gain levels and to the range of total gain. As before, the pre-distortion setting maps to and changes with the analog gain.

One aspect illustrated by table 370 is that, for a specified total gain, a specified analog gain may be determined and a digital gain may be adjusted to provide the specified total gain when summed with the analog gain. Thus, for an implementation similar to FIG. 8, anytime a total gain changes from a first total gain to a second total gain, the analog gain is only changed if the second gain is not in the same total gain range of the first gain. If the first and second total gains are within the same total gain range, the analog gain and pre-distortion setting remain unchanged and only the digital gain is changed.

Figure 9:
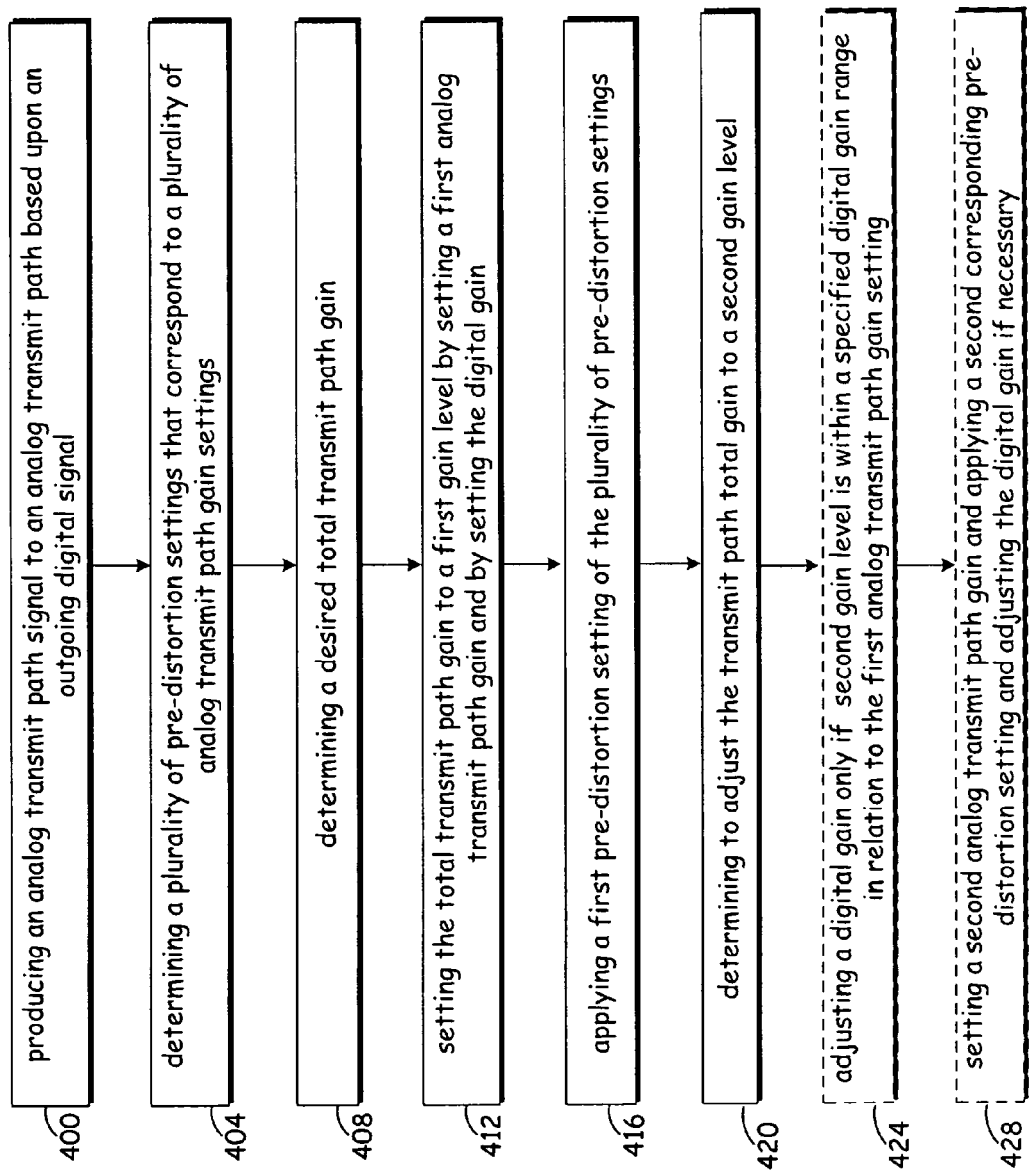
FIG. 9 is a flow chart that illustrates a method for producing an outgoing radio frequency signal according to one embodiment of the invention.

FIG. 9 is a flow chart that illustrates a method for producing an outgoing radio frequency signal according to one embodiment of the invention. The method initially comprises a digital processor or baseband processor producing an outgoing digital signal having a digital gain. In at least one embodiment, the outgoing digital signal is produced to an analog-to-digital conversion module. Thereafter, the method includes producing an analog transmit path signal to an analog transmit path based upon the outgoing digital signal (step 400).

In one embodiment of the invention, the method includes determining a plurality of pre-distortion settings that correspond to a plurality of analog transmit path gain settings (step 404). As described before, the gain settings may be for any one gain module such as, for example, the power amplifier of for the total analog transmit path gain. Thus, regardless of the definition or type of gain settings, this step 404 comprises determining a plurality of pre-distortions curves that define one or more pre-distortion settings for a corresponding plurality of gain settings.

Thereafter, the method includes determining a desired total transmit path gain (step 408) and setting the total transmit path gain to a first gain level by setting a first analog transmit path gain to one of a plurality of specified settings and by setting the digital gain so that, when added to the first analog transmit path gain, the desired total transmit path gain is produced (step 412). In the described embodiment, the analog transmit path gain is set to one of a plurality of specified gain levels. Additionally, a maximum magnitude of change of the digital gain is equal to a step size between each of the specified gain levels. In one embodiment, the specified levels for the analog transmit path gain include −6 dB, 0 dB, 6 dB, and 12 dB and the digital gain is adjusted up to +/−3 dB from the specified level. In an alternate embodiment, the specified levels include −6 dB, 0 dB, 6 dB, and 12 dB and the digital gain is adjusted from 0 to 6 dB from the specified level.

Subsequently, the method includes applying a first pre-distortion setting of the plurality of pre-distortion settings that corresponds to the first analog transmit path gain to counteract distortion that is caused by at least one of a plurality of modules in the analog transmit path (step 416). Thereafter, the method includes determining to adjust the transmit path total gain to a second gain level (step 420). To achieve the transmit path total gain, one of two possible approaches is possible. First, the method may include adjusting a digital gain only if second gain level is within a specified digital gain range in relation to the first analog transmit path gain setting (step 424). Alternatively, the method may include, when the second gain level exceeds the specified range, setting a second analog transmit path gain and applying a second corresponding pre-distortion setting (step 428). This step includes, if necessary, adjusting the digital gain to provide the second gain level.

In an alternate embodiment, the second pre-distortion setting may be determined in real time based upon a detected distortion in a feedback path during normal transmit operations. In yet another alternate embodiment, the method further includes adjusting a gain setting of a power amplifier in the transmit path and setting a pre-distortion setting based upon the gain setting of the power amplifier. In this particular embodiment, the gain settings for which the stored pre-distortion settings apply are gain settings for the power amplifier. The gain settings may also be defined, however, for any one of a filter, a mixer, or a signal amplifier in the transmit path. Each defined gain setting, however, includes a corresponding pre-distortion compensation setting stored for use when the corresponding gain setting is selected.

Figure 10:
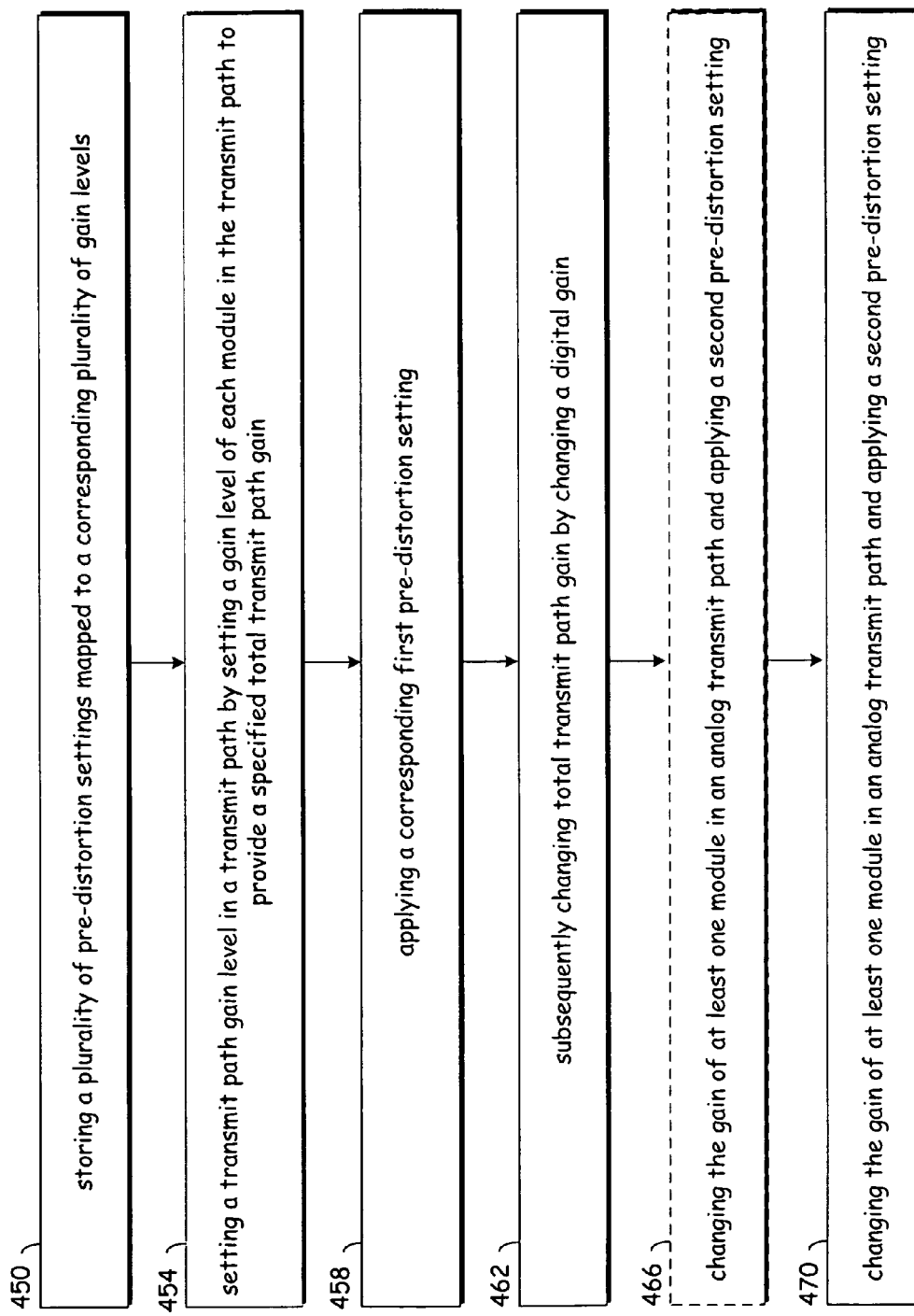
FIG. 10 illustrates a method for generating a radio frequency signal according to one embodiment of the invention.

FIG. 10 illustrates a method for generating a radio frequency signal according to one embodiment of the invention. The method initially comprises storing a plurality of pre-distortion settings mapped to a corresponding plurality of gain levels (step 450). Thereafter, the method includes setting a transmit path gain level in a transmit path by setting a gain level of each module having selectable gain in the transmit path to provide a (first) specified total transmit path gain (step 454). For this embodiment, therefore, the plurality of pre-distortion settings correspond to a plurality of specified total transmit path gain settings. Thus, a specified (first) pre-distortion setting is applied that corresponds to the specified total transmit gain (step 458). Thereafter, the method includes subsequently changing the total transmit path gain by changing a digital gain (step 462) to provide a new or second specified total transmit path gain. In this example, wherein the second specified total transmit path gain can be provided solely by changing the digital gain, only the digital gain is changed. Moreover, the method includes continuing to apply the first pre-distortion setting after changing the total transmit path gain as long as only the digital gain is changed. If the second specified total transmit path gain exceeds a specified threshold, however, then the method further includes changing the transmit gain and applying a second pre-distortion signal. Typically, a gain change will be required after a change in at least one of a power setting, a gain setting, an operating temperature, a supply voltage level, and a load impedance. In one embodiment, the corresponding pre-distortion settings are based upon a total analog transmit path gain. In a different embodiment, the corresponding pre-distortion settings are based upon gain values of one or more specific gain modules in the analog transmit path. Thus, for this embodiment, the method includes changing the gain of at least one module in an analog transmit path and applying a second pre-distortion setting (step 470).

The above described embodiment of the invention includes storing a plurality of pre-distortion settings to correspond to a plurality of specified gain settings. The specified gain settings may correspond to a particular gain module such as a power amplifier or, alternately, to a gain for a plurality of gain modules in the analog transmit path. In one embodiment, a transmitter is operable to generate an analog signal for a plurality of gain settings for the analog transmit path and to determine and store a pre-distortion setting for each of the plurality of gain settings wherein the first and second pre-distortion settings correspond to one of the stored pre-distortion settings. In an alternate embodiment, after each change in the analog transmit path gain, the transmitter is operable to analyze a feedback signal in real time and applying a pre-distortion setting based upon the feedback signal As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A method for producing an outgoing radio frequency signal by a radio transceiver, the method comprising:
 producing an outgoing digital signal having a digital gain;
 producing an analog transmit path signal to an analog transmit path based upon the outgoing digital signal;
 determining a plurality of pre-distortion settings that correspond to a plurality of analog transmit path gain settings;
 determining a desired total transmit path gain;
 setting the total transmit path gain to a first gain level by:
  setting a first analog transmit path gain one of a plurality of specified settings; and
  setting the digital gain so that, when added to the first analog transmit path gain, the desired total transmit path gain is produced;
 applying a first pre-distortion setting of the plurality of pre-distortion settings that corresponds to the first analog transmit path gain to counteract distortion that is caused by at least one of a plurality of modules in the analog transmit path;
 determining to adjust the transmit path total gain to a second gain level;
 adjusting a digital gain only if second gain level is within a specified digital gain range in relation to the first analog transmit path gain setting;
 when the second gain level exceeds the specified range, setting a second analog transmit path gain and applying a second corresponding pre-distortion setting; and
 adjusting the digital gain, if necessary, to provide the second gain level.

2. The method of claim 1 wherein the analog transmit path gain is set to one of a plurality of specified gain levels.

3. The method of claim 1 wherein a maximum magnitude of change of the digital gain is equal to a step size between each of the specified gain levels.

4. The method of claim 2 wherein the specified levels include −6 dB, 0 dB, 6 dB, and 12 dB wherein the digital gain is adjusted up to +/−3 dB from the specified level.

5. The method of claim 2 wherein the specified levels include −6 dB, 0 dB, 6 dB, and 12 dB wherein the digital gain is adjusted from 0 to 6 dB from the specified level.

6. The method of claim 1 further including adjusting a gain setting of one of a filter, a mixer, or a signal amplifier in the transmit path.

7. The method of claim 1 further including adjusting a gain setting of a power amplifier in the transmit path and setting a pre-distortion setting based upon the gain setting of the power amplifier.

8. The method of claim 1 wherein the second pre-distortion setting is determined in real time based upon a detected distortion in a feedback path during normal transmit operations.

9. A method for generating a radio frequency signal by a radio transceiver, the method comprising:
 setting a transmit path gain level in an analog transmit path by setting a gain level of each module in the analog transmit path to provide a specified total transmit path gain;
 applying a corresponding first pre-distortion setting; and
 subsequently changing total transmit path gain by changing a digital gain only if total gain change is within a specified range of a total analog transmit path gain.

10. The method of claim 9 further including continuing to apply the first pre-distortion setting after changing the total transmit path gain as long as only the digital gain is changed.

11. The method of claim 9 further including changing the gain of at least one module in an analog transmit path and applying a second pre-distortion setting.

12. The method of claim 11 further including generating an analog signal for a plurality of gain settings for the analog transmit path and determining and storing a pre-distortion setting for each of the plurality of gain settings wherein the first and second pre-distortion settings correspond to one of the stored pre-distortion settings.

13. The method of claim 11 further including, after each change in the analog transmit path gain, analyzing a feedback signal in real time and applying a pre-distortion setting based upon the feedback signal.

14. The method of claim 11 further including changing the transmit gain and applying a second pre-distortion signal after a change in at least one of a power setting, a gain setting, an operating temperature, a supply voltage level, and a load impedance.

15. An integrated circuit radio transceiver, comprising:
 a digital processor operable to produce outgoing digital signals;
 conversion circuitry operable to produce analog signals based upon the outgoing digital signals;
 analog transmit path circuitry;
 logic to selectively apply digital gain settings and gain settings of the analog transmit path circuitry to produce a desired total gain; and
 logic to prompt the digital processor to apply pre-distortion settings based on a set of pre distortion curves to the outgoing digital data to counteract at least one of phase and amplitude distortion introduced by the analog transmit path circuitry wherein the set of pre-distortion curves correspond to a corresponding set of analog transmit path gain settings.

16. The integrated circuit radio transceiver of claim 15 wherein, for a desired total gain adjustment, the integrated circuit radio transceiver is operable to:
 adjust only a digital gain for a required total gain adjustment when the total gain adjustment is within a specified range of a current analog transmit path gain level;
 when the total gain adjustment exceeds the specified range, set the analog transmit path total gain to a new gain level and apply a second pre-distortion setting; and
 adjust the digital gain, if necessary, to provide the required total gain adjustment.

17. The integrated circuit radio transceiver of claim 16 wherein adjusting the digital gain comprises at least one of adjusting the digital gain of the digital signal produced by the digital processor and adjusting a gain of the conversion circuitry.

18. The integrated circuit radio transceiver of claim 16 operable to determine the second pre-distortion setting for the new gain level of the analog transmit path level based upon a feedback signal that is received after the new analog transmit path gain level has been set.

19. The integrated circuit radio transceiver of claim 15 operable to determine the second pre-distortion setting in advance for each of the plurality of specified analog transmit path gain levels of the set of analog transmit path gain settings.

20. The integrated circuit radio transceiver of claim 19 operable to adjust a gain setting of one of a filter, a mixer, a signal amplifier, or a power amplifier in a transmit path to produce a total analog transmit path gain level for which a pre-distortion setting is known.

21. The integrated circuit radio transceiver of claim 19 operable to adjust a gain setting of the analog transmit path and to determine the pre-distortion setting in real time.

22. The integrated circuit radio transceiver of claim 21 operable to adjust a gain setting of the analog transmit path based upon tested operating conditions including at least one of a power setting for the power amplifier, a gain setting for a module in the transmit path other than the power amplifier, a detected temperature, a supply voltage level, or a load impedance.

23. The integrated circuit radio transceiver of claim 21 operable to phase shift a pre-distortion compensation setting based upon the total gain adjustment.

24. The integrated circuit radio transceiver of claim 21 operable to amplitude shift a pre-distortion compensation setting based upon the total gain adjustment.

* * * * *

UNITED STATES PATENT AND TRADEMARK OFFICE
CERTIFICATE OF CORRECTION

PATENT NO. : 8,014,467 B2
APPLICATION NO. : 12/031681
DATED : September 6, 2011
INVENTOR(S) : Arya Reza Behzad It is certified that error appears in the above-identified patent and that said Letters Patent is hereby corrected as shown below:

Col. 15, line 34, in Claim 1: after "gain", and before "one", insert --at--

Signed and Sealed this
First Day of January, 2013

David J. Kappos
*Director of the United States Patent and Trademark Office*